(12) United States Patent
Husmann et al.

(10) Patent No.: US 7,377,980 B2
(45) Date of Patent: May 27, 2008

(54) SELF-ADJUSTING MASKING PLUG FOR COMPLEX PARTS

(75) Inventors: Christopher H. Husmann, Gardena, CA (US); Ralph E. Jaffke, Lakewood, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 220 days.

(21) Appl. No.: 11/345,481

(22) Filed: Feb. 1, 2006

(65) Prior Publication Data

US 2007/0175389 A1 Aug. 2, 2007

(51) Int. Cl.
*B05C 21/00* (2006.01)

(52) U.S. Cl. .................... 118/504; 118/505
(58) Field of Classification Search ............. 118/504, 118/505; D23/260; 428/9, 12; 206/814
See application file for complete search history.

(56) References Cited

U.S. PATENT DOCUMENTS

| | | | |
|---|---|---|---|
| 3,018,535 A | | 1/1962 | Griffin |
| 4,254,524 A | * | 3/1981 | Okui .................... 12/114.6 |
| 4,512,052 A | * | 4/1985 | Bruno .................... 12/116.2 |
| 4,640,434 A | | 2/1987 | Johnsen et al. |
| 5,327,942 A | | 7/1994 | Black |
| 5,829,482 A | | 11/1998 | Takabatake |
| D458,350 S | | 6/2002 | Wagner et al. |
| 6,622,331 B2 | * | 9/2003 | Yanagi .................... 12/114.2 |
| 2004/0084466 A1 | | 5/2004 | Underwood |
| 2005/0005716 A1 | | 1/2005 | Harris |

FOREIGN PATENT DOCUMENTS

| | | |
|---|---|---|
| EP | 1362769 | 11/2003 |
| JP | 02061088 | 3/1988 |

* cited by examiner

*Primary Examiner*—Laura Edwards
(74) *Attorney, Agent, or Firm*—Stetina Brunda Garred & Brucker

(57) ABSTRACT

A self-adjusting masking plug is provided which is adapted to be received in a region of a complex part intended to be masked. The plug has a body adapted to be received within a region of the part intended to be masked. The body includes a first body half having at least one first perimeter wall conforming to a first portion of the intended region to be masked; a second body half having at least one second perimeter wall conforming to a second portion of the intended region to be masked; and a wishbone spring formed internally within the body such that it interconnects the first and second body halves. The wishbone spring includes a first half inner wall transversely spanning and interconnecting portions of the at least one first perimeter wall; a second half inner wall transversely spanning and interconnecting portions of the at least one second perimeter wall; and a common rib interconnecting the first and second inner walls. The plug is adapted to expand or compress depending on the tolerances of the part within the part.

7 Claims, 3 Drawing Sheets

SELF-ADJUSTING MASKING PLUG FOR COMPLEX PARTS

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates to masking plugs for complex parts. In particular, the present invention relates to self-adjusting masking plugs for complex parts which are adapted to be fit into similarly dimensioned parts which have the same dimensions, but which have varying tolerances.

2. Background of the Invention

When a complex aerospace, defense, manufacturing, or industrial machine part or the like is manufactured, the part may have areas which are intended to have exposed machine surfaces as well as surfaces which are coated with various coating materials (primer, paints, powder coat, rust inhibitors, sealants, etc.) Typically, the portion of the part intended to be left exposed without coating is masked with tape and materials, such as plastic sheets or paper. This conventional technique is the most common; however, when dealing with large production runs of the same parts, conventional masking becomes a measurable component is with respect to the manual labor and handling of the part. Also, since the quality of the conventional technique of masking is dependent on the individual performing the job, the results (i.e., quality of mask job) is prone to varying.

In certain situations in which numerous complex parts having the same dimensions are manufactured, to save time in the masking process, a masking plug may be fabricated, wherein the plug may be used repetitively for each complex part. For instance, many parts may have features such as holes, bores, valleys, voids, journals, cylinders, sealing surfaces, etc. which may be easily filled with a masking plug before the coating process takes place. The plug may be made from various materials, such as foam, rubber, plastic, composites, wood or any material which can be formed into a durable object which may be repetitively positioned within the area to be protected from coating without damaging the part surfaces. Once the complex part has been coated, the masking plug is removed from part.

A drawback with masking plugs, however, is that many times the holes, bores, valleys, voids, journals, cylinders, sealing surfaces, etc. [also hereinafter referred to as "masked areas" or "areas intended to be masked], may not always be the exact size. That is to say, even though the complex parts may be built from the same blueprints which have the same dimensions, the tolerances of such parts sometimes vary. For instance, areas not intended to be machined to precise dimensions tend to be manufactured to less precise dimensions and tolerances. And as a result, many times the masking plug does not properly fit into the masked area. Or many times, the masking plug fits, but leaves larger then acceptable gaps between the part and the plug. In this situation, the coating is not blocked by the masking plug and areas intended to be masked end up being inadvertently coated and the removal of the inadvertent coated areas adds cost to the manual labor component.

It would advantageous to provide a masking plug for complex parts which overcomes some of the fallbacks found with the aforementioned methods of masking. In particular, it would be beneficial to design a masking plug which is adapted to be received into an intended masking area, while at the same time, has a self-adjusting feature which allows the size the masking plug to expand and contract. Such an adjustable masking plug would help eliminate the unwanted gaps created as a result of an ill-fitting masking plug.

BRIEF SUMMARY OF THE INVENTION

The present invention is intended to overcome and solve the aforementioned problems commonly encountered with masking plugs. Furthermore, the present invention provides better performance characteristics than any previously known or published approaches.

According to the present invention, a self-adjusting masking plug is provided which is adapted to be received in a region of a complex part intended to be masked. An exemplary masking plug includes a plug body adapted to be received within a region of the complex part intended to be masked. The plug body comprises a first body half having at least one first perimeter wall conforming to a first portion of the intended region to be masked; a second body half having at least one second perimeter wall conforming to a second portion of the intended region to be masked; and a wishbone spring formed internally within the plug body such that it interconnects the first and second body halves.

According to an aspect of the present invention, the wishbone spring preferably includes a first half inner wall transversely spanning and interconnecting portions of the at least one first perimeter wall; a second half inner wall transversely spanning and interconnecting portions of the at least one second perimeter wall; and a common rib interconnecting the first and second inner walls. With such a configuration, the masking plug is adapted to be inserted into the region of the complex part intended to be masked, and further adapted to expand or compress depending on the tolerances of the part. Also, the wishbone spring may further include a first half inclined connecting member which interconnects the first half inner wall to the common rib, and a second half inclined connecting member which interconnects the second half inner wall to the common rib.

According to another aspect of the present invention, an adjustable seam is formed by interfacing an edge the first plug body half to an edge the second plug body, wherein the seam may generally be positioned in a same plane of which the common rib is positioned. In another aspect of the present invention, a common annular space is formed between the first and second half inner walls.

Moreover, another aspect of the present invention includes the masking plug having the ability to maintain secured within the complex part due to forces exerted by the at least one first and second perimeter walls against the complex part.

According to yet another aspect of the present invention, at least one overhang panel is integrally formed thereto to the plug for masking areas adjacent the masking plug. And, according to another embodiment of the present invention, the self-adjusting masking plug further comprises at least one more self-adjusting masking plug attached to the masking plug to form a masking device comprising multiple self-adjusting masking plugs.

According to another aspect of the present invention, the masking plug is preferably formed by selective laser sintering. And according to other aspects of the present invention, the masking plug is made from NYLON 12 or NYLON 11.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
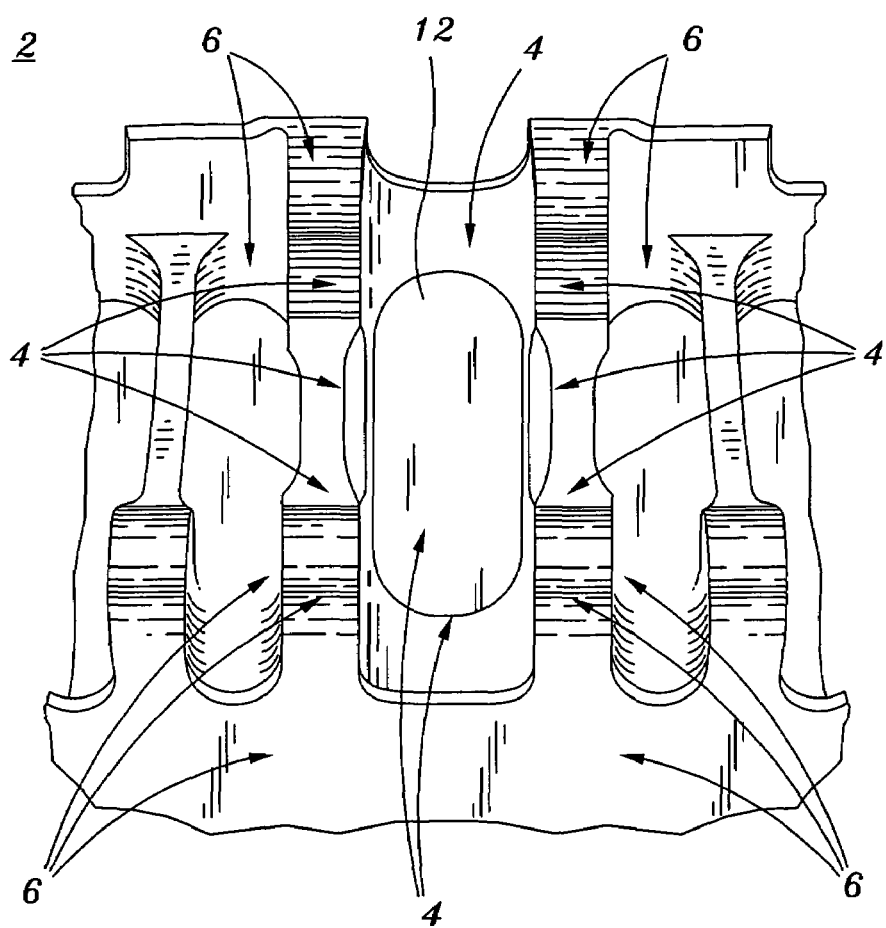
FIG. 1 shows an exemplary complex part, according to an aspect of the present invention.

FIG. 1 shows an exemplary complex part 2, according to an aspect of the present invention. The complex part 2 includes a region 4 in which it is desired to not have a coating applied. The complex part 2 further includes areas 6 which are intended to be coated. For example, the exemplary complex part 2 shown in FIG. 1 includes a cavity or valley 12 which is desired to not receive any coating. It is recognized that the complex part 2 shown in FIG. 1 is merely exemplary, and that, the present invention may be utilized with any part which includes a void, hole, bore, valley, journal, cylinders, sealing surfaces or the like or any other region of a part in which a masking plug may be received therein.

Figure 2:
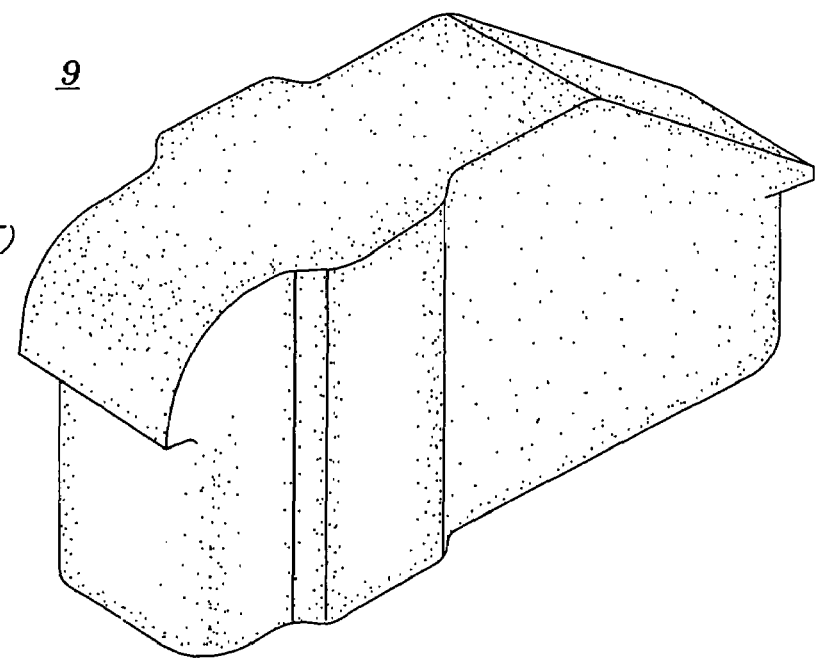
FIG. 2 shows a conventional plug specifically formed to fill in and cover up the area intended to be masked.

FIG. 2 shows a conventional masking plug 9 which has been specifically formed and molded to be somewhat precisely received within the intended masked region 4 of the complex part 2. With this method, the conventional masking plug 9 is formed to cover at least an area or region of the complex part 2 which is not intended to be coated. The conventional masking plug can be constructed from a variety of materials, such as expandable foam, rubber, plastic, composites, wood, metal or any material which can be formed into a durable object which may be repetitively positioned within the area to be protected from coating without damaging the part surfaces. Also, once the conventional masking plug 9 has been formed, it may be coated with a protective sealant, resilient coating or the like, so as to help maintain the shape the plug while providing an outer surface which will not damage any of the complex part 2 surfaces. In the alternative, the conventional masking plug 9 may be typically milled or cut to shape by merely knowing the dimensions of the area of which is intended to be masked. After the conventional masking plug 9 is finished, it theoretically can be used over and over again for parts which are built from the same dimensions.

Figure 3:
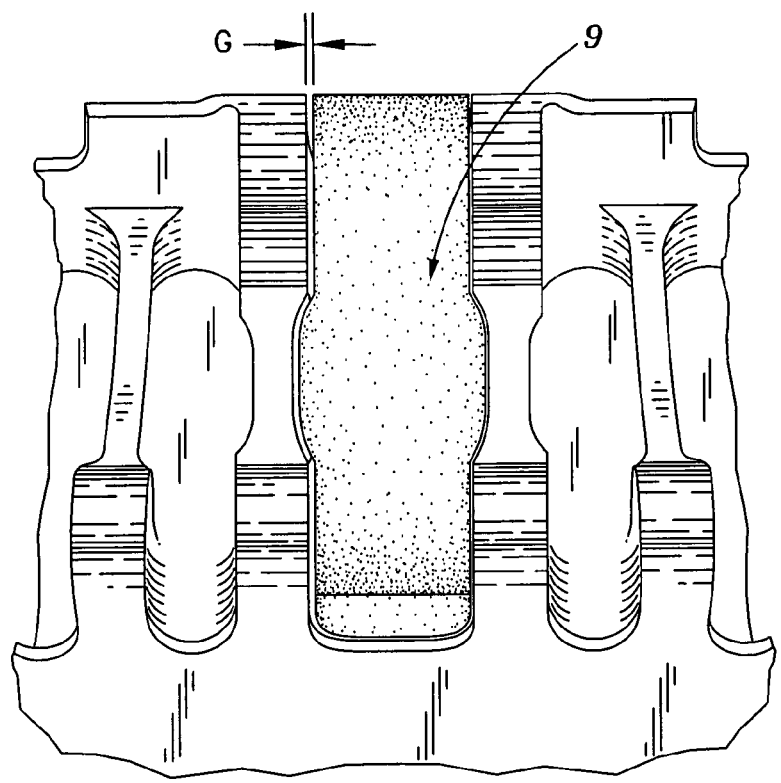
FIG. 3 shows the same complex part with the conventional masking plug installed and received within the intended area to be masked.

FIG. 3 shows the same complex part 2 with a conventional masking plug 9 installed and received within the intended masked region 4 (covered by masking plug 9). As already discussed, the downfall to this type of conventional masking plug 9 is that in many cases, the tolerances of the complex part 2, and in particular, the holes, bores, valleys, voids, journals, cylinders, sealing surfaces, etc., may substantially vary due to relaxed tolerances. Therefore, the conventional plug 9 either (1) may not even fit into the region to be masked, or (2) may fit, however, it may leaves gaps G which do not cover areas intended to not be coated.

Figure 4:
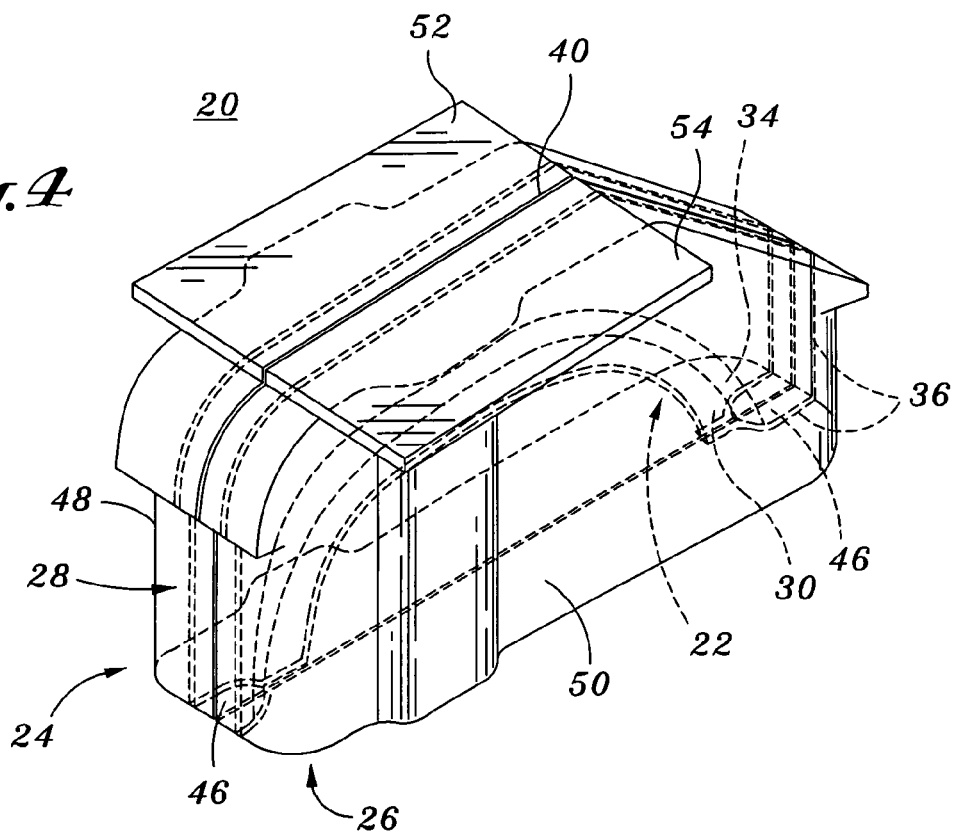
FIG. 4 shows an upper perspective view of an exemplary self-adjusting masking plug, according to an aspect of the present invention.

FIG. 4 shows an upper perspective view of an exemplary self-adjusting masking plug 20, according to an aspect of the present invention; while FIG. 4 shows a bottom perspective view of the exemplary self-adjusting masking plug 20, according to an aspect of the present invention. The self-adjusting masking plug 20 includes a plug body 28 which conforms to the area or region (or void therein) which is intended to be masked within the complex part 2. The masking plug 20 may also include cover panels 52, 54 which further protect areas adjacent to the plug 20 which are intended to not be coated. It is understood that self-adjusting masking plug 20 of the present invention may take the form and shape of innumerous shapes and sizes, and thus, may be adapted to be received into the regions intended to be masked of any part of which a masking plug can be received therein.

Preferably, the self-adjusting masking plug 20 is made from either NYLON 12 or NYLON 11 utilizing a selective laser sintering process. However, in the alternative, the present invention may be made from various plastics utilizing known plastic injection molding techniques.

Figure 5:
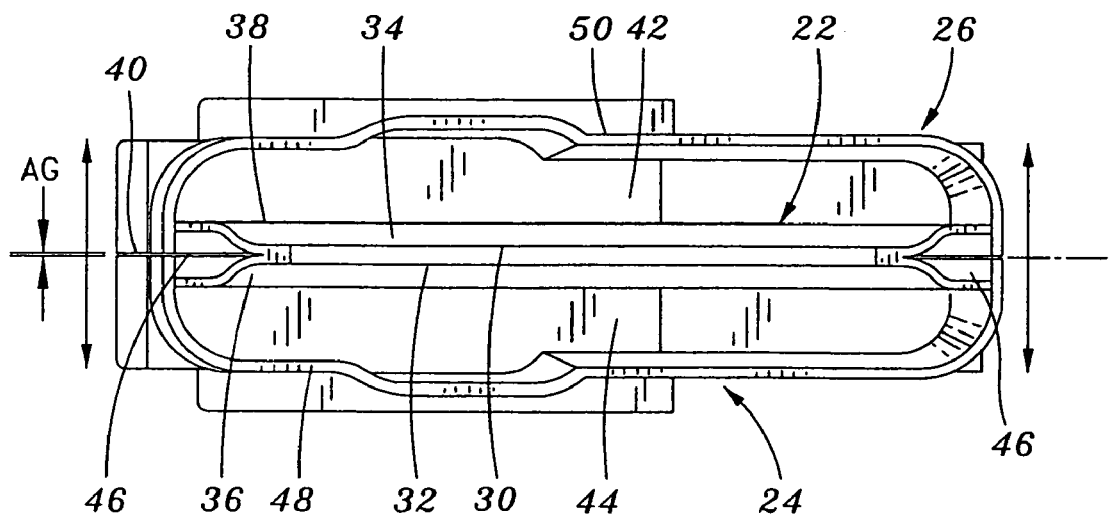
FIG. 5 shows a bottom perspective view of the exemplary self-adjusting masking plug, according to an aspect of the present invention.

One aspect of the exemplary self-adjusting masking plug 20 is that it includes a first body half 24 having at least one first perimeter wall 48 conforming to a first portion of the intended region to be masked 4 (see FIG. 1), and a second body half having 26 having at least one second perimeter wall 50 conforming to a second portion of the intended region to be masked (see FIG. 1). As can be seen in both FIGS. 4 and 5, one aspect of the present invention is that an adjustable seam 40 is disposed between the first and second body halves 24, 26. The adjustable seam 40 allows the self-adjusting masking plug 20 to expand and contract, and therefore, adjust to variances in tolerances. The details of how the adjustable seam 40 is integrated into the self-adjusting masking plug 20 are now explained in more detail below.

The adjustable seam 40 is integrated into the self-adjusting masking plug 20 by utilizing a wishbone spring 22 formed internally within the plug body such that it interconnects the first and second body halves 24, 26. Preferably, the wishbone spring 22 includes a first half inner wall 36 transversely spanning and interconnecting portions of the first half body wall 48. The wishbone spring 22 further includes a second half inner wall 38 transversely spanning and interconnecting portions of the second half body wall 50. The inner walls 36, 38 are further commonly joined to form a common rib 30 interconnecting the first and second halves 24, 26 of the plug body. And optionally, a first half inclined connecting member 32 is provided which interconnects the first half inner wall 36 to the common rib 30, and a second half inclined connecting member 34 is provided which interconnects the second half inner wall 38 to the common rib 30. Therefore, as can be seen clearly in FIG. 5, the wishbone spring 22 has a cross-section that resembles a "Y" or a "wishbone" wherein a common annular space 46 is formed and defined between the first and second body halves 24, 26; the first and second half inner walls 36, 38; the first and second half inclined connecting members 32, 34; and the common rib 30. Additionally, it is preferred that the adjustable seam 40 having an adjustable gap AG is formed generally in the same plane of the common rib 30.

Another aspect of the present invention is that the self-adjusting masking plug 20 may also include cover panels 52, 54 which may be integrally formed to the masking plug 20. Such panels 52, 54 are useful for masking areas adjacent the holes, bores, valleys, voids, journals, cylinders, sealing surfaces, etc. which are intended to be masked, but of which will not accept a plug.

Figure 6:
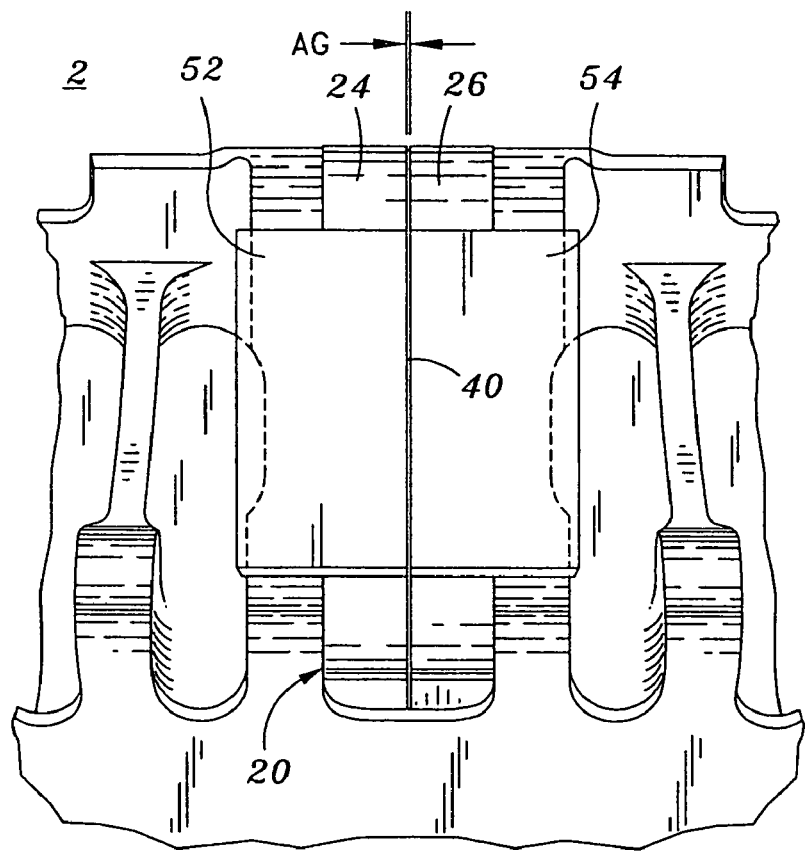
FIG. 6 shows the complex part with the self-adjusting masking plug installed and received within the area intended to be masked, according to an aspect of the present invention.

FIG. 6 shows the complex part 2 with the self-adjusting masking plug 20 installed and received within the intended masked region of the complex part 2, according to an aspect of the present invention. In this scenario, the masking plug 20 is adapted to slightly compress (thereby reducing its overall dimension) and expand (thereby increasing its overall dimension) due to the resilience of the wishbone spring 22. Thus, the self-adjusting masking plug 20 is adapted to be inserted into the region of the complex part 2 intended to be masked and expand or contract depending on the tolerances of the part. Additionally, once the masking plug 20 is installed, the expanding abilities of the wishbone spring 22 assists the masking plug 20 in staying fixed within the complex part 2 without falling out. That is to say, the outward spring force exerted by the wishbone spring 22 presses the first and second body half walls 48, 50 against the complex part 2. Therefore, sometimes the masking plug 20 will be retained within the complex part 2 without the need for masking tape. This can be beneficial when the complex part is rotated and/or moved during a coating process.

In an alternative embodiment of the present invention, a plurality of self-adjusting masking plugs 20 may be formed together such that a plurality of holes, bores, valleys, voids, journals, cylinders, sealing surfaces, etc. from one complex part 2 may be masked concurrently. For example, several masking plugs 20 maybe interconnected via the overhang panels 52, 54, such that a series of areas can be masked together using one master self-adjusting masking plug.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and such uses are within the scope of the appended claims.

What is claimed is:

1. A self-adjusting masking plug adapted to be received in a region of a complex part intended to be masked, the masking plug comprising:
   a plug body adapted to be received within a region of the complex part intended to be masked, the plug body comprising,
      a first body half having at least one first perimeter wall conforming to a first portion of the intended region to be masked;
      a second body half having at least one second perimeter wall conforming to a second portion of the intended region to be masked;
   a wishbone spring formed internally within the plug body such that it interconnects the first and second body halves, the wishbone spring comprising,
      a first half inner wall transversely spanning and interconnecting portions of the at least one first perimeter wall;
      a second half inner wall transversely spanning and interconnecting portions of the at least one second perimeter wall;
      a common rib interconnecting the first and second inner walls; and
   at least one overhang panel integrally formed on top of the masking plug for masking areas adjacent the masking plug;
   wherein the masking plug is adapted to be inserted into the region of the complex part intended to be masked, and further adapted to expand or compress depending on the tolerances of the part.

2. The self-adjusting masking plug according to claim 1, the wishbone spring further comprising,
   a first half inclined connecting member which interconnects the first half inner wall to the common rib, and
   a second half inclined connecting member which interconnects the second half inner wall to the common rib.

3. The self-adjusting masking plug according to claim 1, wherein an adjustable seam is formed by interfacing an edge the first plug body half to an edge the second plug body.

4. The self-adjusting masking plug according to claim 3, wherein a common annular space is formed between the first and second half inner walls.

5. The self-adjusting masking plug according to claim 3, wherein the seam is generally positioned in a same plane of which the common rib is positioned.

6. The self-adjusting masking plug according to claim 1, further comprising at least one more self-adjusting masking plug attached to the masking plug to form a masking device comprising multiple self-adjusting masking plugs.

7. The self-adjusting masking plug according to claim 1, wherein the masking plug is made from polymeric materials.

\* \* \* \* \*